US011401576B2

(12) United States Patent
Hinojosa Garza et al.

(10) Patent No.: US 11,401,576 B2
(45) Date of Patent: Aug. 2, 2022

(54) INDUCTION HEAT TREATING APPARATUS

(71) Applicant: METALSA S.A. DE C.V., Apodaca (MX)

(72) Inventors: Rene Javier Hinojosa Garza, Escobedo (MX); Laura Isabel Garcia Villareal, San Nicolas de los Garza (MX); Felipe Arturo Martinez Carrasco, Monterrey (MX); Javier Tenorio Cervantes, Monterrey (MX)

(73) Assignee: METALSA S.A. DE C.V., Nuevo Leon (MX)

( * ) Notice: Subject to any disclaimer, the term of this patent is extended or adjusted under 35 U.S.C. 154(b) by 42 days.

(21) Appl. No.: 16/761,032

(22) PCT Filed: Nov. 6, 2017

(86) PCT No.: PCT/IB2017/056931

§ 371 (c)(1),
(2) Date: May 1, 2020

(87) PCT Pub. No.: WO2019/086940

PCT Pub. Date: May 9, 2019

(65) Prior Publication Data

US 2021/0062291 A1 Mar. 4, 2021

(51) Int. Cl.
*C21D 9/60* (2006.01)
*C21D 9/56* (2006.01)
(Continued)

(52) U.S. Cl.
CPC ............ *C21D 9/60* (2013.01); *C21D 1/42* (2013.01); *C21D 1/667* (2013.01); *C21D 9/562* (2013.01); *C21D 9/5735* (2013.01)

(58) Field of Classification Search
CPC .......... C21D 11/005; C21D 1/42; C21D 1/60; C21D 1/667; C21D 9/562; C21D 9/5735; C21D 9/60
(Continued)

(56) References Cited

U.S. PATENT DOCUMENTS 4,142,923 A 3/1979 Satava
4,318,534 A * 3/1982 Thome ................ B21B 45/0233
266/113
(Continued)

FOREIGN PATENT DOCUMENTS

EP 0385571 A1 9/1990
JP 2009007653 A 1/2009
(Continued)

OTHER PUBLICATIONS

European Patent Office Extended Search Report for Application No. 17930506.5 dated Mar. 17, 2021 (9 pages).
(Continued)

*Primary Examiner* — Scott R Kastler
*Assistant Examiner* — Michael Aboagye
(74) *Attorney, Agent, or Firm* — Gregory D. DeGrazia; Miller, Canfield, Paddock & Stone PLC

(57) ABSTRACT

A continuous induction heat treating apparatus is provided including a conveyor path defining an axis for a workpiece to be conveyed through the apparatus. The apparatus includes an induction heating station positioned along the conveyor path and operable to induce heating in the workpiece as the workpiece is conveyed through the induction heating station. A quenching station is positioned in a downstream direction from the induction heating station. The quenching station is coupled to a water supply and includes a plurality of sprayers in fluid communication with the water supply and operable to spray water toward the axis (Continued)

for quenching the workpiece as the workpiece is conveyed through the quenching station. The apparatus further includes a quench adjustment mechanism including an actuator coupled to at least a first one of the plurality of sprayers for re-positioning a point of intersection defined between the first sprayer and the axis.

10 Claims, 13 Drawing Sheets

(51) Int. Cl.
  *C21D 9/573* (2006.01)
  *C21D 1/42* (2006.01)
  *C21D 1/667* (2006.01)
(58) Field of Classification Search
  USPC ...... 266/90, 103, 104, 78, 99, 259; 148/637, 148/644, 645, 646; 219/600, 645, 646, 219/653, 671, 672, 673, 675, 676, 674
  See application file for complete search history.

(56) References Cited

U.S. PATENT DOCUMENTS

| | | | |
|---|---|---|---|
| 4,394,194 A | 7/1983 | Satava et al. | |
| 5,495,094 A | 2/1996 | Rowan et al. | |
| 5,885,522 A | 3/1999 | Giannini et al. | |
| 5,968,293 A | 10/1999 | Giannini et al. | |
| 8,986,600 B2 * | 3/2015 | Nallen | C21D 1/62 |
| | | | 266/114 |
| 9,462,641 B2 | 10/2016 | Akers | |
| 9,850,553 B2 * | 12/2017 | Work | C22C 38/22 |
| 10,844,467 B2 * | 11/2020 | Gaensbauer | B21C 47/16 |
| 2002/0104597 A1 * | 8/2002 | Frank | B21B 37/74 |
| | | | 148/541 |
| 2003/0208296 A1 | 11/2003 | Brisson et al. | |
| 2004/0084443 A1 | 5/2004 | Ulrich et al. | |
| 2013/0312879 A1 | 11/2013 | Nallen et al. | |
| 2015/0075679 A1 | 3/2015 | Garza | |
| 2016/0024607 A1 | 1/2016 | Work et al. | |
| 2016/0060725 A1 | 3/2016 | Garza | |
| 2016/0067737 A1 | 3/2016 | Hudaff et al. | |
| 2016/0116097 A1 | 4/2016 | Akers et al. | |

FOREIGN PATENT DOCUMENTS

| | | |
|---|---|---|
| KR | 101746984 B1 | 6/2017 |
| WO | 199827235 A1 | 6/1998 |

OTHER PUBLICATIONS

International Search Report and Written Opinion for Application No. PCT/IB2014/001625 dated Feb. 26, 2015 (47 pages).
International Search Report and Written Opinion for Application No. PCT/IB2015/000226 dated Jul. 10, 2015 (11 pages).
International Search Report and Written Opinion for Application No. PCT/IB2017/056931 dated Mar. 23, 2018 (13 pages).

* cited by examiner

INDUCTION HEAT TREATING APPARATUS

BACKGROUND

The present disclosure relates to an induction heat treating apparatus.

SUMMARY

In one aspect, the invention provides a continuous induction heat treating apparatus including a conveyor path defining an axis for a workpiece to be conveyed through the apparatus. The apparatus includes an induction heating station positioned along the conveyor path and operable to induce heating in the workpiece as the workpiece is conveyed through the induction heating station. A quenching station is positioned in a downstream direction from the induction heating station. The quenching station is coupled to a water supply and includes a plurality of sprayers in fluid communication with the water supply and operable to spray water toward the axis for quenching the workpiece as the workpiece is conveyed through the quenching station. The apparatus further includes a quench adjustment mechanism including an actuator coupled to at least a first one of the plurality of sprayers for re-positioning a point of intersection defined between the first sprayer and the axis.

In another aspect, the invention provides a method of operating a continuous induction heat treating apparatus including conveying a workpiece along a conveyor path defining an axis. The method further includes measuring a shape parameter of a profile of a portion of the workpiece with at least one sensor at a position along the axis located in an upstream direction from an induction heating coil, and conveying the portion of the workpiece through the induction heating coil while the induction heating coil is energized so that the portion of the workpiece is heated. The heated portion of the workpiece is conveyed along the conveyor path from the induction heating coil to a quenching station including a plurality of sprayers. A position of at least one of the plurality of sprayers is adjusted, by the controller in response to an output of the at least one sensor, with a quench adjustment mechanism including an actuator coupled to the at least one sprayer in order to re-position a point of intersection defined between the at least one sprayer and the axis. The portion of the workpiece is quenched by spraying water onto the portion of the workpiece from the plurality of sprayers.

In another aspect, the invention provides a method of operating a continuous induction heat treating apparatus. A workpiece is conveyed through a first heating station along a conveyor path defining an axis so that the workpiece is heated by a heating element as it passes through the first heating station. The workpiece piece is conveyed through a quenching station having a plurality of sprayers spraying water onto the workpiece to quench the workpiece as it passes through the quenching station. At least one sensor is operated to measure a shape parameter of the workpiece at a position along the axis in a downstream direction from the quenching station as the workpiece moves along the conveyor path. The method further includes collecting a series of outputs of the at least one sensor representative of the shape parameter at the position with a controller programmed to receive the series of outputs of the at least one sensor in order to identify axial bowing of the workpiece relative to the axis. The workpiece is conveyed to a second heating station including an induction heating coil and copper laminations positioned relative to the induction heating coil for changing a heating distribution in the second heating station. The copper laminations are adjusted relative to the induction heating coil with an actuator coupled to the controller based on the series of outputs of the at least one sensor representative of the shape parameter in order to reduce or correct the axial bowing of the workpiece.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
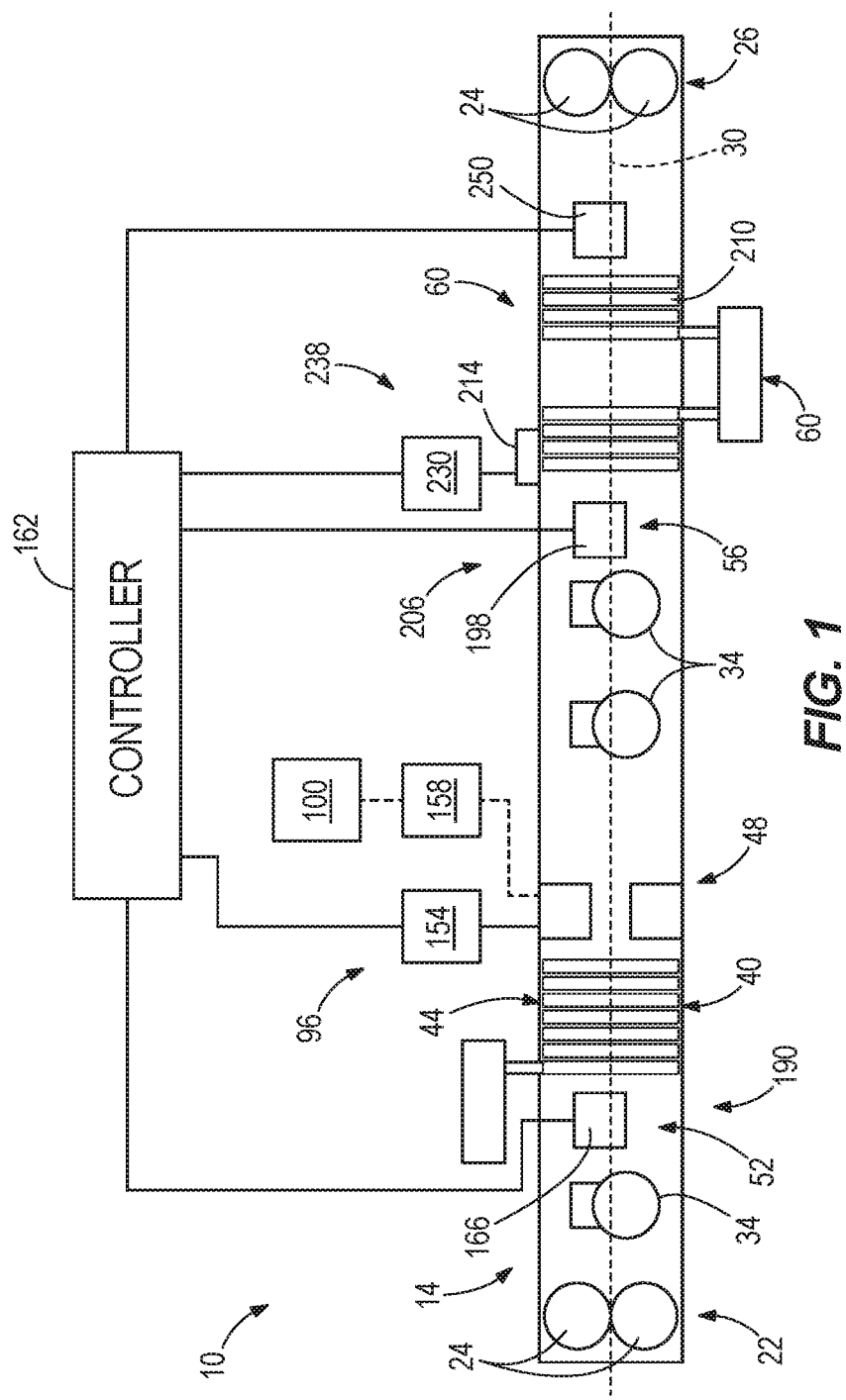
FIG. 1 is a schematic view of a continuous induction heat treating apparatus including a first heating station, a quenching station, a profile sensing station, and a second heating station.

FIG. 1 is a schematic view of a continuous induction heat treating apparatus 10 including a conveyor path 14 and a plurality of individual work stations positioned along the conveyor path 14. A workpiece 38 (FIG. 5) is configured to be continuously conveyed through the stations of the apparatus 10 along the conveyor path 14. Multiple sets of non-restraining guide rollers 34 may be used to guide the workpiece 38 along the conveyor path 14. In addition, the workpiece 38 is configured to enter the apparatus 10 at an entrance 22 and leave the apparatus 10 at an exit 26. Drive rollers 24 at the entrance and exit of the apparatus 10 operate at the same speed to convey the workpiece 38 at a predetermined conveyance speed through the apparatus 10. The drive speed may be controller-adjustable to operate at a variety of speeds. The conveyor path 14 defines a longitudinal axis 30 extending between the entrance 22 and the exit 26 in which the workpiece 38 is to be conveyed along as the workpiece 38 is conveyed through the apparatus 10.

The apparatus 10 includes at least a first heating station 40, a quenching station 48, and a second heating station 60 for heat treating the workpiece 38. The quenching station 48 is positioned in a downstream direction from the first heating station 40 relative to the conveyor path 14. The second heating station 60 is positioned downstream from the quenching station 48 relative to the conveyor path 14. The apparatus 10 may further include a first profile sensing station 52 and a second profile sensing station 56. The first and second heating stations 40, 60 can be operated, respectively, as a workpiece hardening station and a workpiece tempering station that heats the workpiece 38 to a lower temperature than the hardening station. In some constructions, the apparatus 10 can include a single heating station.

Figure 2:
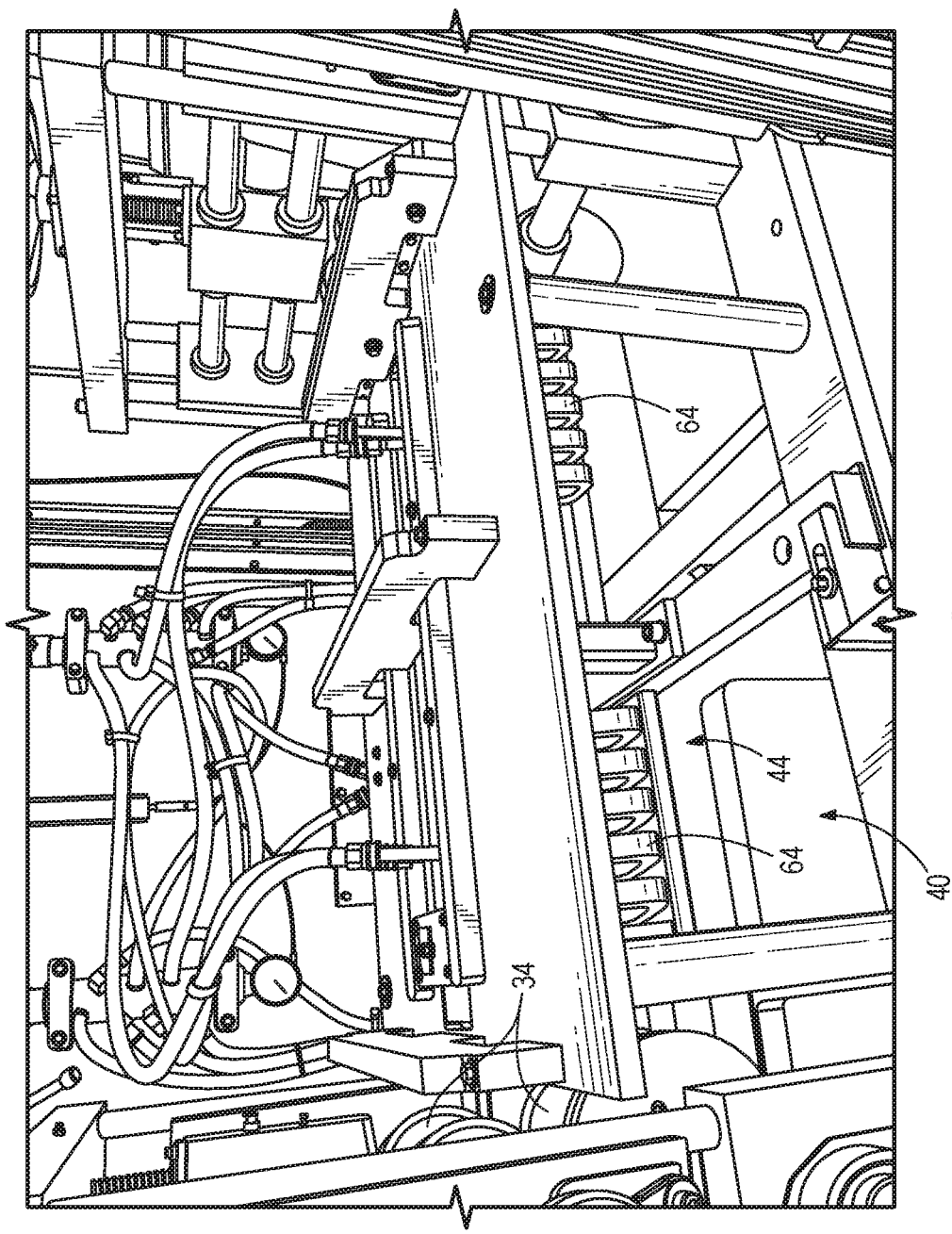
FIG. 2 is a perspective view of the first heating station.

As shown in FIG. 2, the first heating station 40 includes a heating element 44 for heating the workpiece 38 (not shown) as it passes through the first heating station 40. The illustrated heating element 44 includes an induction heating coil operable to induce heating in the workpiece 38 as the workpiece 38 is conveyed through the first heating station 40. The induction heating coil includes a plurality of coil sections 64 for inducing electrical eddy currents and resultant heating within the workpiece 38 while passing through the first heating station 40. In the illustrated embodiment, the induction heating coil includes a counter-wound induction coil assembly in which the coil sections 64 includes two axially-spaced coil sections wound in opposite directions. The two coil sections wound in opposite directions are less likely to induce a shape change in the workpiece 38.

FIGS. 1 and 3-5 illustrate the quenching station 48 including a plurality of sprayers 92 and a quench adjustment mechanism 96 coupled to at least one of the sprayers 92. The plurality of sprayers 92 may be positioned adjacent the conveyor path 14 such that the plurality of sprayers 92 surround the workpiece 38 as the workpiece 38 is conveyed along the conveyor path 14 through the quenching station 48. In addition, the quenching station 48 is coupled to a water supply 100 and the plurality of sprayers 92 is in fluid communication with the water supply 100 (FIG. 1). The quenching station 48 may further include servo valves 158 coupled to the water supply 100 for controlling water pressure and/or flow.

Figure 4:
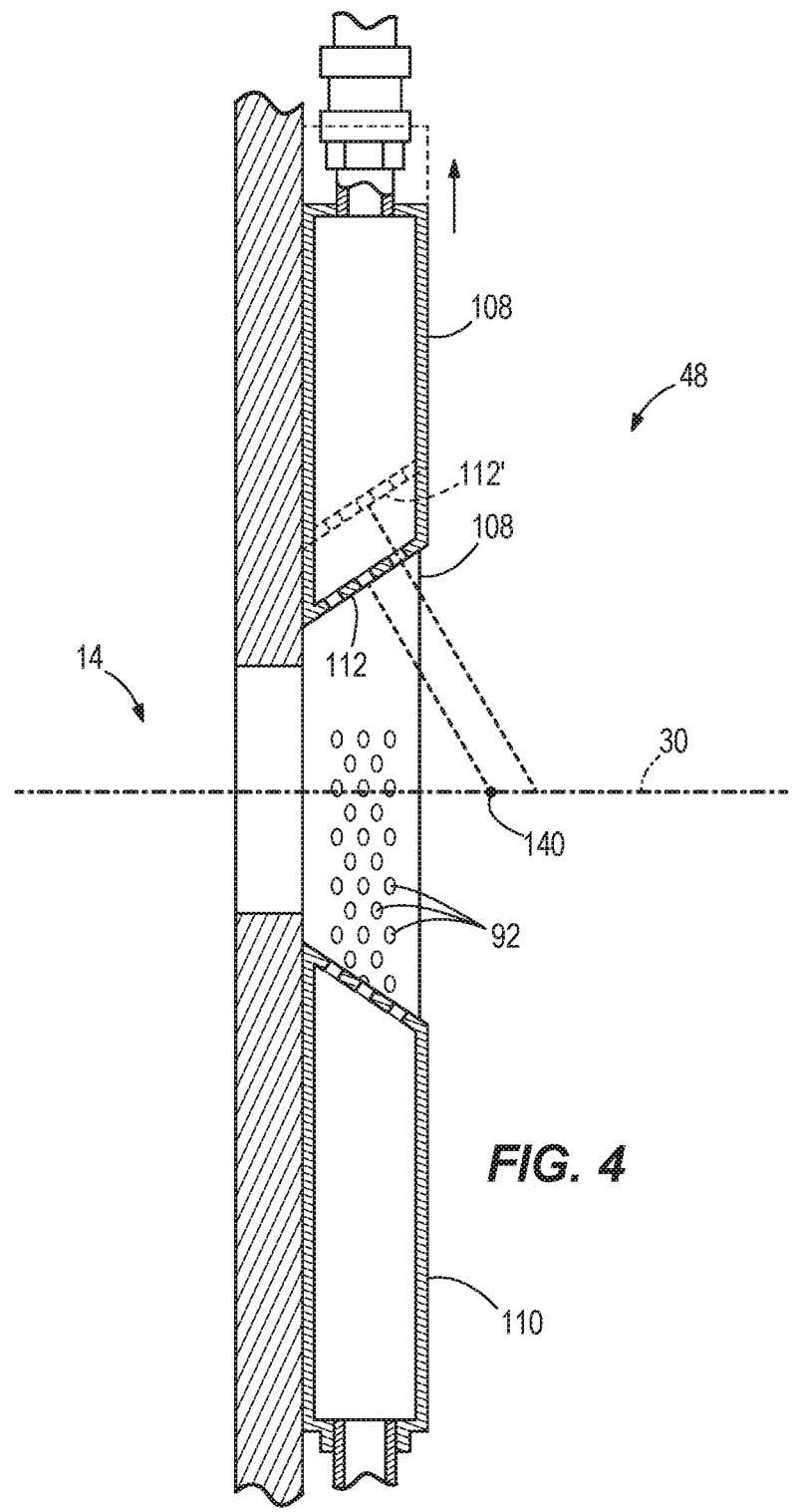
FIG. 4 is a side view of a cross section taken along line 4-4 of the quenching station of FIG. 3.
Figure 5:
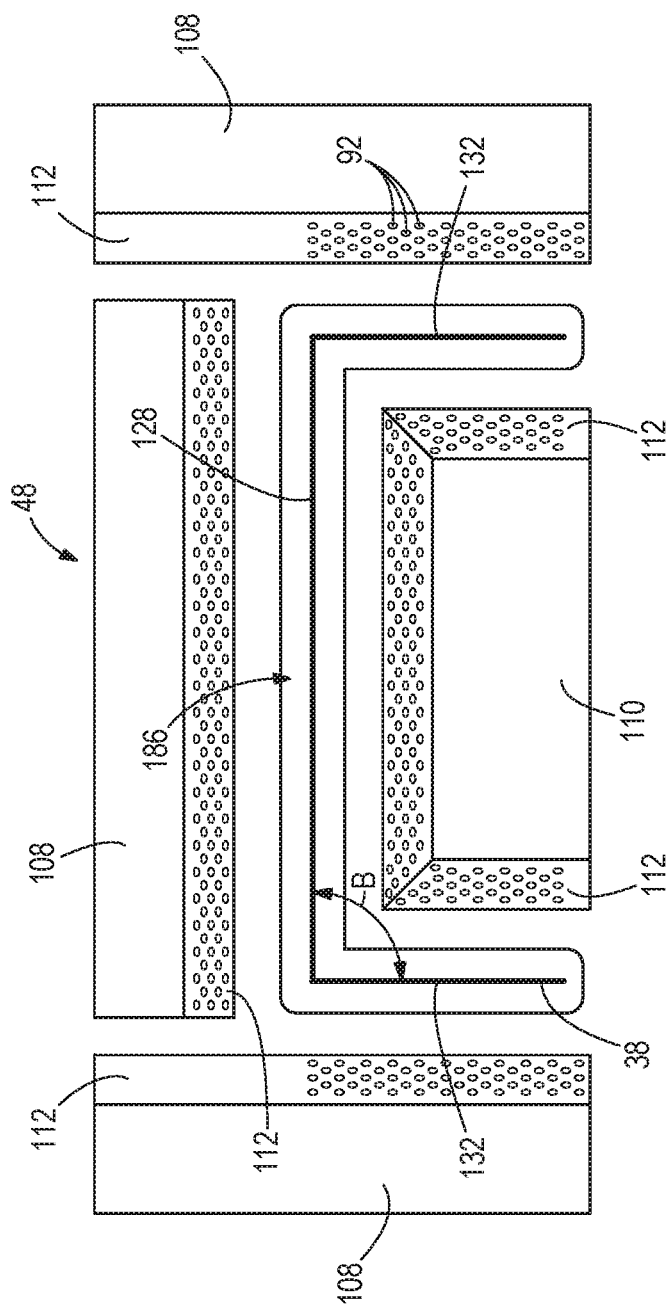
FIG. 5 is an end view of the quenching station of FIG. 3.

With reference to FIGS. 4-5, the axis 30 defined by the conveyor path 14 extends through the quenching station 48. A cross section of the workpiece 38 may be positioned on the axis 30 as the workpiece 38 is moved along the conveyor path 14 through the quenching station 48 (FIG. 5). The plurality of sprayers 92 is operable to spray water from the water supply 100 in a sprayer direction towards the conveyor path 14 (i.e., towards the workpiece 38 positioned on the axis 30). The water from the plurality of sprayers 92 is operable to intersect the axis 30 at a designated location along the axis 30 (i.e., defining a corresponding quench location within the apparatus 10 for quenching the workpiece 38). For example, as shown in FIG. 4, the water is sprayed from the plurality of sprayers 92 towards the axis 30 in which the water may spray from one or more apertures such that the water intersects the axis 30 to define a point of intersection 140 between the sprayer(s) and the axis 30. As shown in FIG. 5, the first sprayer includes one aperture such that the water intersects the axis at a point. The plurality of sprayers 92 is configured to adjust (i.e., move) relative to the axis 30 such that the point of intersection 140 can be adjusted.

Figure 3:
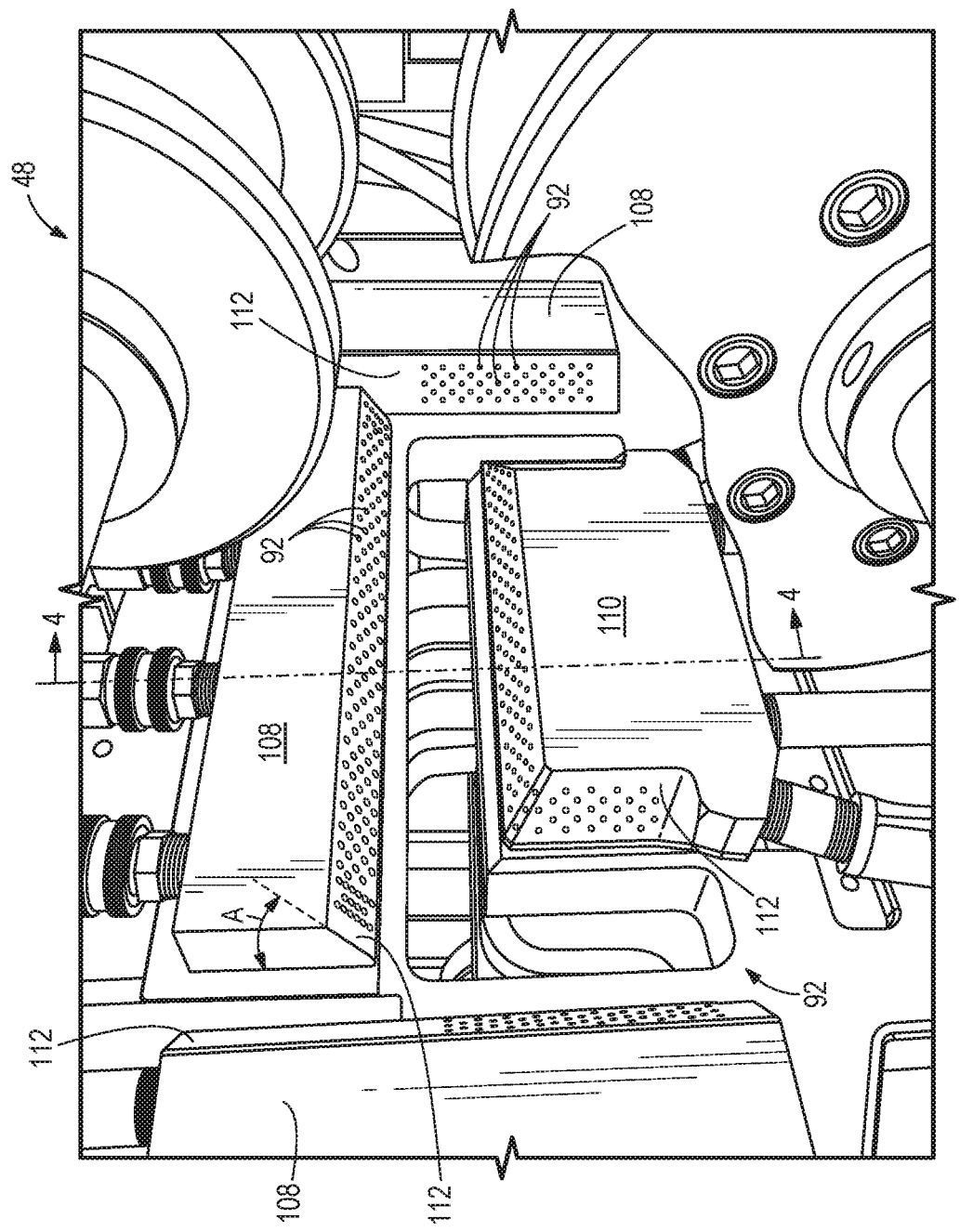
FIG. 3 is a perspective view of the quenching station.

As shown in FIGS. 3 and 5, the illustrated plurality of sprayers 92 are provided in separate groups as pluralities of apertures formed in quench blocks 108, 110 such that each quench block 108, 110 forms a sprayer unit. In other constructions, each sprayer unit can be formed by one or more apertures or sprayers. In the illustrated embodiment, the plurality of sprayers 92 is formed in four quench blocks (FIG. 5) including multiple outer quench blocks 108 and one multi-directional inner 110 quench block. The quench blocks 108, 110 are positioned around the conveyor path 14 to provide coverage around the entire cross-section of the workpiece 38, inside and outside. In other embodiments, the plurality of sprayers 92 may be dispersed among more or less than four quench blocks 108, 110.

With reference to FIG. 5, each quench block 108, 110 may include one or more surfaces 112 in which the sprayers 92 are provided. In the illustrated embodiment, each outer quench block 108 defines a single sprayer surface 112 and the inner quench block 110 defines multiple sprayer surfaces 112. In the illustrated construction, all the sprayer surfaces 112 are planar, but one or more of the sprayer surfaces 112 can take other non-planar shapes as well, including simple and compound curves. The sprayers 92 are formed by the apertures on each surface 112 and are provided for spraying water from the water supply 100 towards the conveyor path 14. The apertures forming the sprayers 92 may be arranged in a pattern or array (e.g., rows and columns) on each sprayer surface 112. The pattern may include the apertures in rows and columns in which each row and column may be offset to the adjacent row and column. In addition, each aperture within a sprayer surface 112, or the group of sprayer surfaces 112, may have a cross-sectional dimension (e.g., diameter) that is the same, or different cross-sectional dimensions can be provided among the various apertures. The plurality of sprayers 92 on each quench block 108, 110 may be grouped together in separate groups forming independent zones. The pattern or array of the apertures forming the plurality of sprayers 92 may be different amongst the individual zones. For example, as shown in the illustrated construction, at least one of the quench blocks 108 may have zones near each distal end of the sprayer surface 112 that have more densely arranged sprayers 92. The distal end zones provide more sprayer capacity per unit area compared with the central zone of the sprayer surface 112. The additional sprayer capacity can either offset the effects of internal features within the quench block 108 that would otherwise limit the flow. Alternately, the additional sprayer capacity can provide increased flow zones, which may be beneficial in an area of the workpiece 38 where the cross-sectional material amount is locally increased (e.g., a bend formed between two flat portions).

With reference to FIG. 3, the sprayer surface 112 of each quench block 108 is positioned adjacent the conveyor path 14 to face toward the conveyor path 14 along which the workpiece 38 is conveyed during operation. However, one, some, or all the sprayer surfaces 112 may be angled so that the sprayers 92 are not oriented to spray directly toward the workpiece 38 in a direction transverse to the conveyor path 14. For example, the sprayer surfaces 112 can be angled to face toward the downstream direction to define an angle A measured with respect to the transverse direction as shown. The angle A may be between 30 degrees and 75 degrees. In some constructions, the angle A can be between 40 degrees and 65 degrees (e.g., 45 degrees or 60 degrees) for each of the plurality of quench blocks 108, 110. In other embodiments, the angle A may be different for one or more of the quench blocks 108, 110. Due to the angle A, the quench water is always directed in the downstream direction so as not to splash back and interfere with the temperature of the workpiece 38 upstream of the designated quench point. As discussed in further detail below, the angle A also allows the point of intersection 140 during quenching to be adjusted along the axis 30 for one or more quench blocks 108, 110 without moving the quench block(s) 108, 110 along the axis 30.

With reference to FIGS. 3 and 5, the apparatus 10 is configured to receive an open section workpiece 38 with a cross sectional shape having a plurality of distinct sections. The illustrated workpiece 38 has a C-shape cross section including a web 128 and two flanges 132 positioned at opposite ends of the web 128 (FIG. 5). The illustrated quench blocks 108, 110 are positioned to surround the conveyor path 14 corresponding to the C-shape cross section of the workpiece 38. As shown in FIG. 5, a center of the web 128 of the workpiece 38 is positioned on the axis 30 of the conveyor path 14. One of the plurality of sprayers 92 of one of the quench blocks 108 is oriented to spray water towards the web 128 and the axis 30 such that a point of intersection 140 (FIG. 4) is defined between the first sprayer and the axis 30. Of course, the actual point of water impingement on the web 128 depends on the material thickness of the workpiece 38. It is noted that the illustrated point 140 is representative of one particular sprayer 92 of the plurality of sprayers 92 in the quench block 108, which may define additional intersection points. As such, it will be understood that the point of intersection defined, in side view, by the sprayer unit formed by the quench block 108 as a whole is represented as a zone encompassing the various points. Even in considering a single sprayer 92 formed by a single aperture, the point of intersection 140 will, in practice, correlate to a defined zone and not an infinitesimal point. Further, it may be considered that the conveyor path 14 has a 2-dimensional shape, which in the illustrated construction, is a C-shape following the cross-sectional shape of the workpiece 38, and a longitudinal axis parallel to the axis 30 can be defined at any given point that is offset along the cross-sectional shape from true center.

As shown in FIGS. 1 and 3-5, the quench adjustment mechanism 96 includes an actuator 154 coupled to one or more, but not all of the quench blocks 108, 110 such that the associated sprayer(s) 92 are movable relative to the axis 30. In other words, one or more sprayers 92 of the quenching station 48 are movable by the quench adjustment mechanism 96. In the illustrated construction where the sprayers 92 are provided as apertures in the quench blocks 108, 110, movement of the at least one quench block 108, 110 by the actuator 154 moves all the associated sprayer(s) 92 provided therein. When actuated, the actuator 154 is operable to re-position the point of intersection 140 along the axis 30. This allows, through operation of the actuator 154, re-positioning the point of intersection 140 defined between a first sprayer 92 or sprayer group with respect to another point or points of intersection defined between one or more other sprayer(s) 92 and the axis 30. In addition, the actuator 154 can include any or all of hydraulic or pneumatic cylinder(s), one or more electric motors, coupled via a linkage or gear train, or other suitable structures. In the illustrated embodiment, the actuator 154 is coupled to one of the outer quench blocks 108 for movement by the actuator 154 relative to the axis 30.

Figure 11:
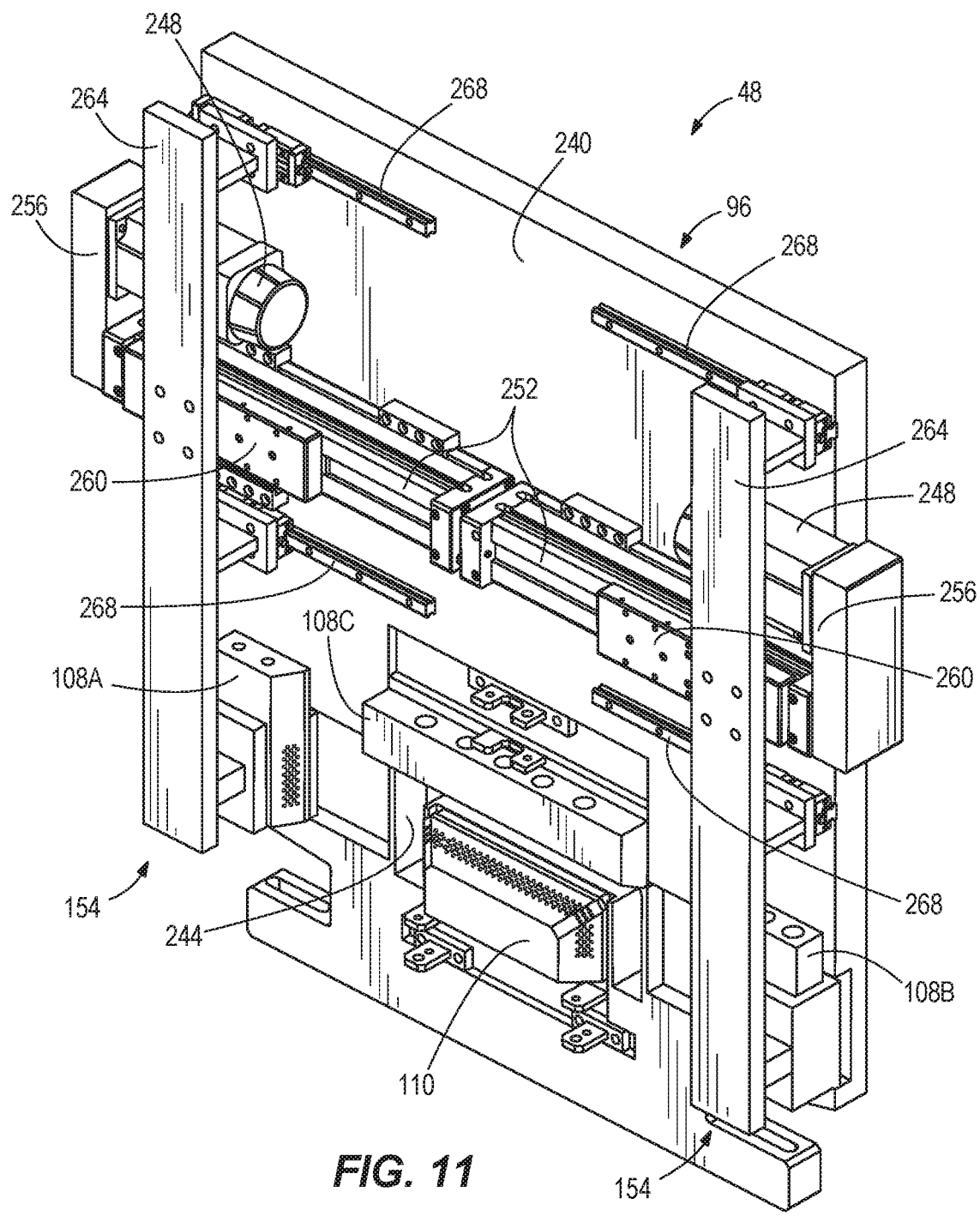
FIG. 11 is a perspective view of a detailed embodiment of the quenching station of FIG. 1.

FIG. 11 illustrates the quenching station 48 in further detail. As shown, the quenching station 46 includes a base 240 and the quench adjustment mechanism 96. The base 240 defines an opening 244 having the C-shape on the conveyor path 14 such that the cross-sectional shape of the workpiece 38 is conveyed through the opening 244. The quench blocks 108, 110 are positioned on the base 240 and surround the opening 244. The outer quench blocks 108A and 108B are positioned adjacent the two flanges of the C-shaped opening 244, and the outer quench block 108C and the inner quench block 110 are positioned above and below the web of the C-shaped opening 244. In addition, each outer quench block 108A and 108B is coupled to the quench adjustment mechanism 96 such that the outer quench blocks 108A, 108B are movable and the outer quench block 108C and the inner quench block 110 are fixed. The illustrated quench adjustment mechanism 96 includes two actuators 154, one for each outer quench block 108A, 108B such that the movement of the outer quench blocks 108A, 108B are independent relative to each other. Specifically, each actuator 154 includes a motor 248 and a guide 252. Each guide 252 is linear and includes a ball screw and a movable block 260. A belt is positioned within a housing 256 between the motor 248 and the guide 252. Specifically, the belt is positioned on an output of the motor 248 and an end of the ball screw for providing a rotary motion. The block 260 includes a bearing rotatably coupled to the ball screw for converting the rotary motion to linear motion. Each outer quench block 108A, 108B is coupled to the block 260 by a bracket 264 configured to slide along tracks 268 positioned on the base 240 as the motor 248 rotates the ball screw via the belt. The linear movement of the block 260 moves the associated outer quench block 108A, 108B closer to or father from the C-shaped opening 244 (i.e., the workpiece 38). Therefore, each actuator 154 can re-position the point of intersection 140 defined by one or more of the associated sprayer(s) 92 of each outer quench block 108A, 108B and the axis 30 using the motor 248, the ball screw, and the block 260. In other embodiments, the quench adjustment mechanism 96 may include any number of actuators 154 to enable adjustment of any combination of the quench blocks 108, 110. For example, the outer quench block 108A and 108C may be each coupled to one of the actuators 154 for movement, while the other outer quench block 108B and inner quench block 110 are fixed. Furthermore, any one or all of the quench blocks 108, 110 may include separate, adjustable sections. For example, the inner quench block 110 may include at least two separately adjustable sections, either in lieu of or in addition to the movement of the outer quench blocks 108A, 108B described above.

Figure 8:
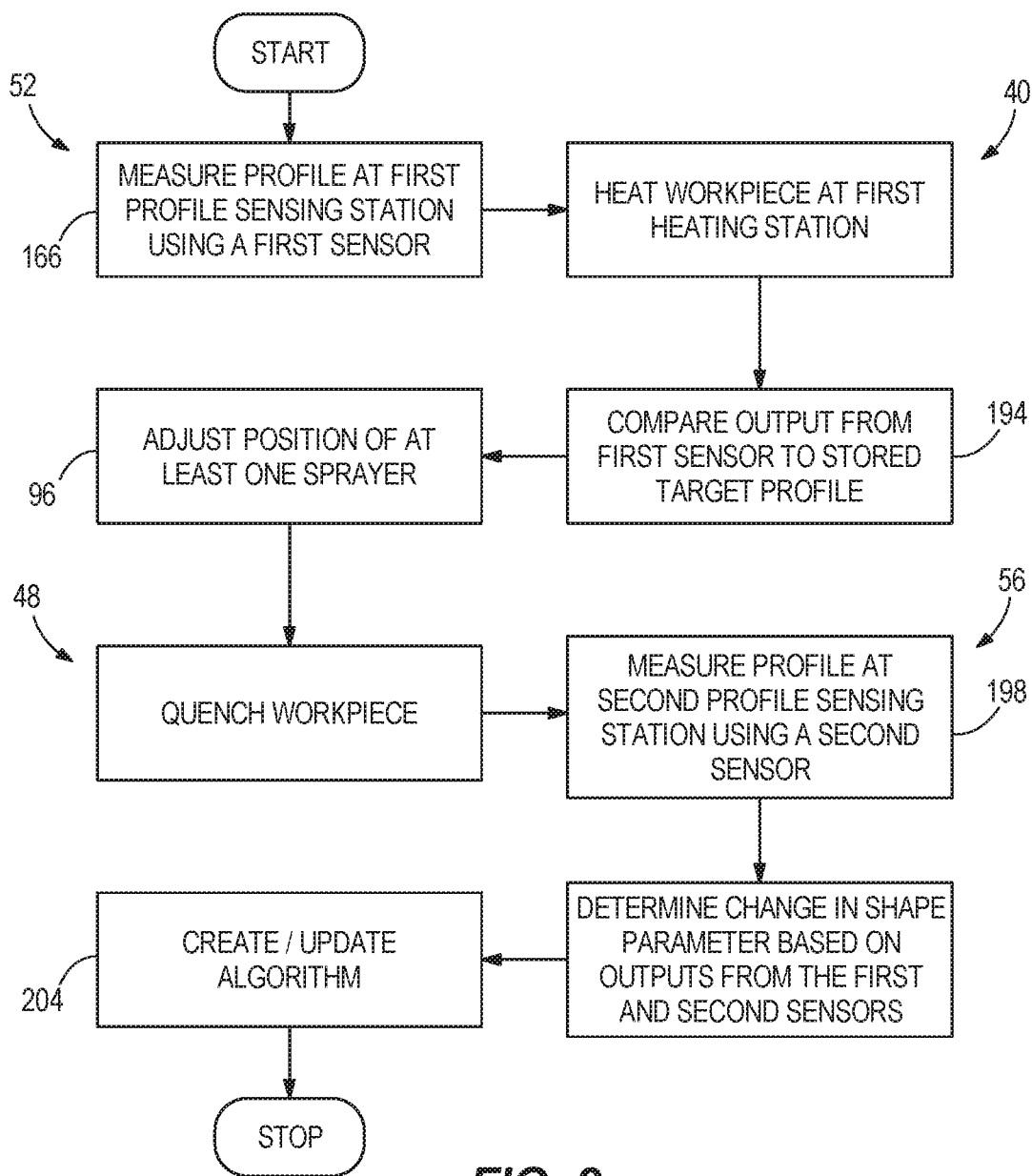
FIG. 8 is a flow diagram illustrating an exemplary method of operating the continuous induction heat treating apparatus of FIG. 1.
Figure 9A:
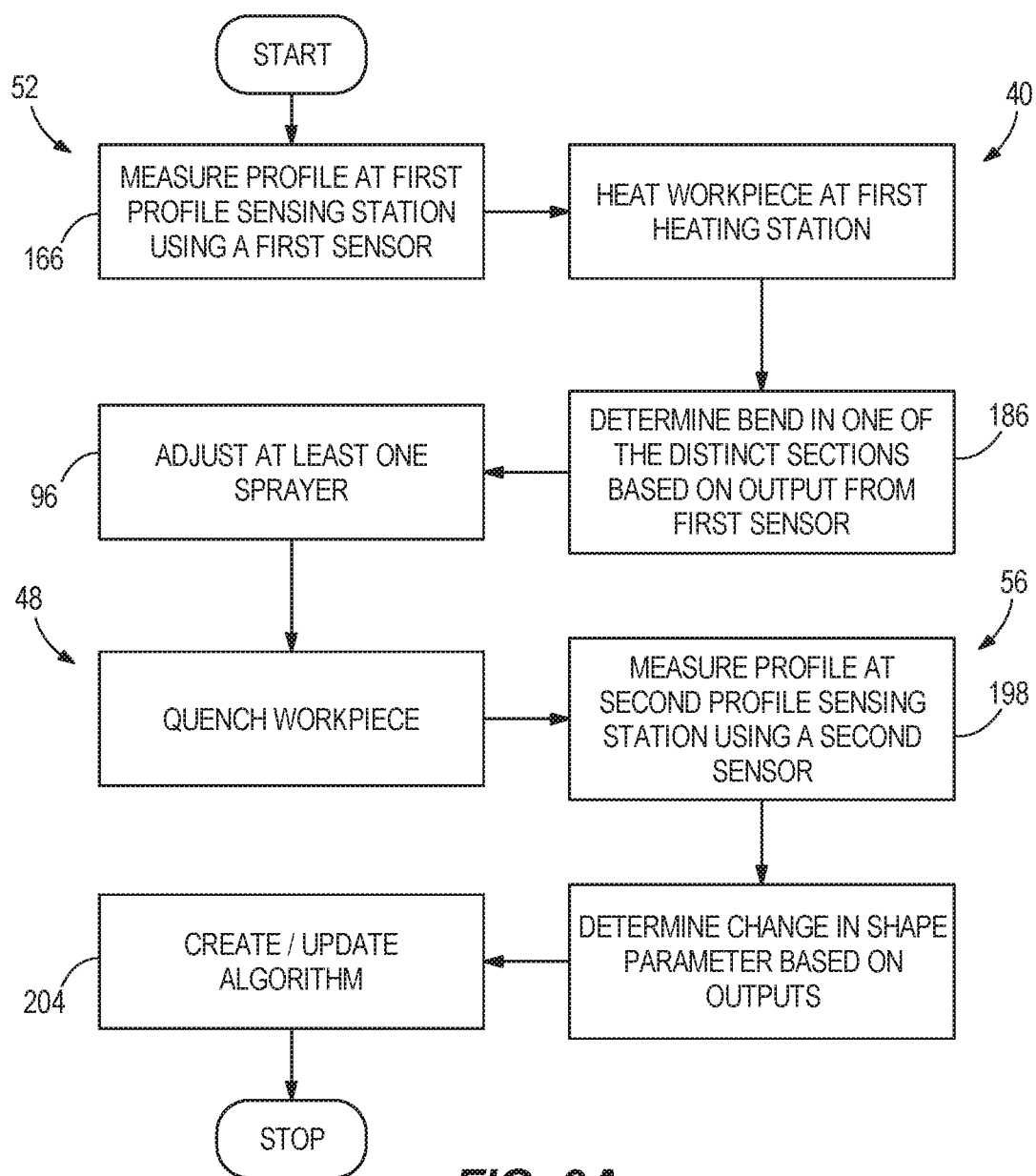
FIG. 9A is another flow diagram illustrating an exemplary method of operating the continuous induction heat treating apparatus of FIG. 1.
Figure 9B:
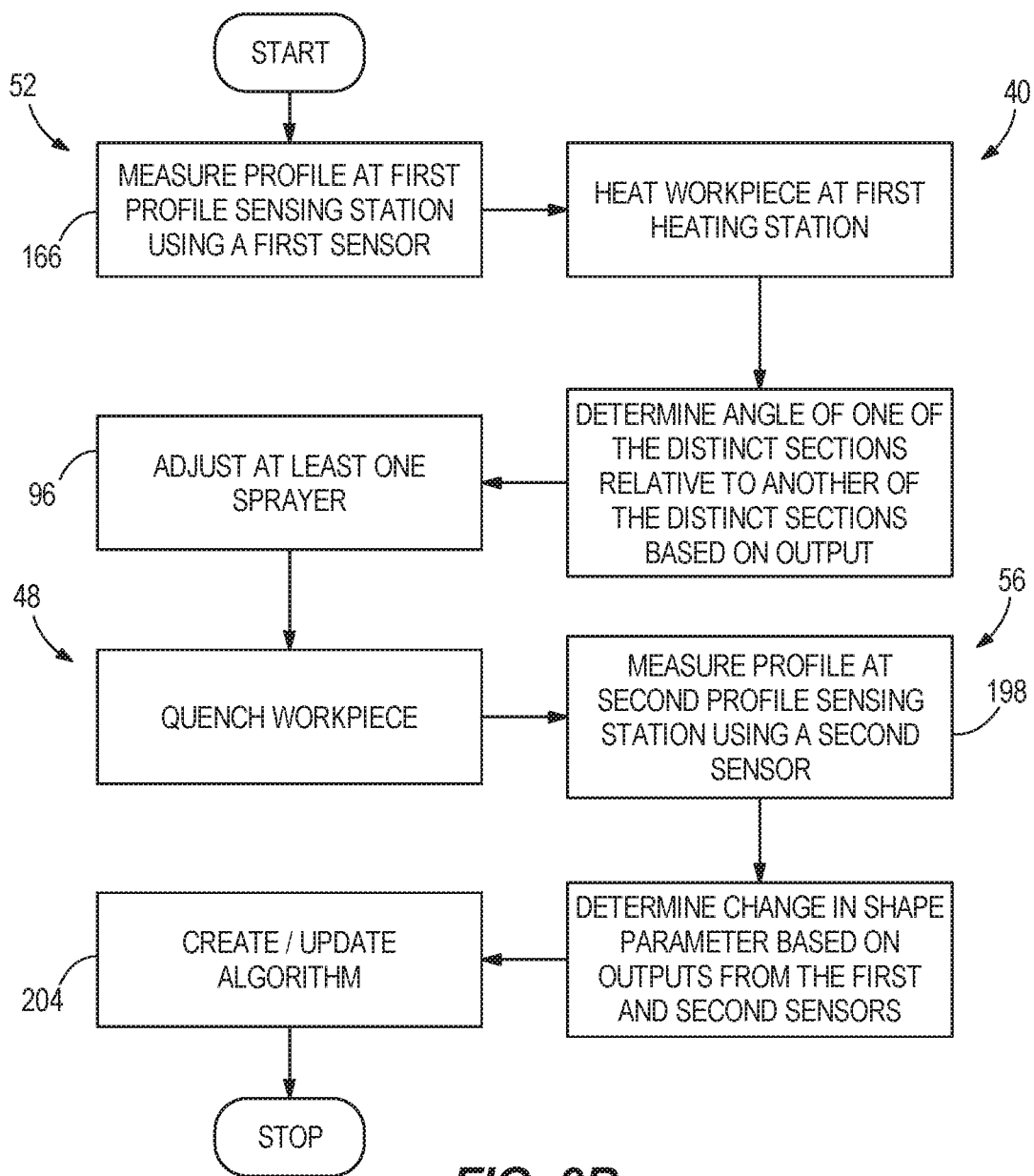
FIG. 9B is still another flow diagram illustrating an exemplary method of operating the continuous induction heat treating apparatus of FIG. 1.

As shown in FIGS. 1 and 8, the actuator 154 of the quench adjustment mechanism 96 is coupled to a controller 162. The controller 162 is programmed to manipulate the actuator 154 for movement of the sprayer(s) 92 relative to the axis 30. The apparatus 10 includes at least one sensor 166 operable to measure one or more shape parameters of a profile (i.e., cross section) of the workpiece 38. The controller 162 receives an output of the at least one sensor 166 representative of the shape parameter(s). Specifically, the controller 162 is programmed to manipulate the actuator 154 of the quench adjustment mechanism 96 based on the output. By setting or adjusting the actuator 154, the shape parameter may be actively controlled and in some cases at least partially corrected during quenching in order to form/keep the workpiece 38 in spec after quenching. "In spec" may be defined as a set of tolerances for each dimension (e.g., flatness or straightness of the web 128 and/or flanges 132, angles between the web 128 and flange(s) 132) of the profile of the workpiece 38, in which each dimension is between each set of tolerances. In addition, the multiple sets of non-restraining guide rollers 34 are operable to guide the workpiece 38 along the conveyor path 14 with clearance so as not to positively constrain the workpiece profile during quenching in an attempt to maintain the desired final shape. Rather, shape alteration in the workpiece profile is distinctly made possible and influenced in a controlled manner to obtain the desired results.

Figure 12:
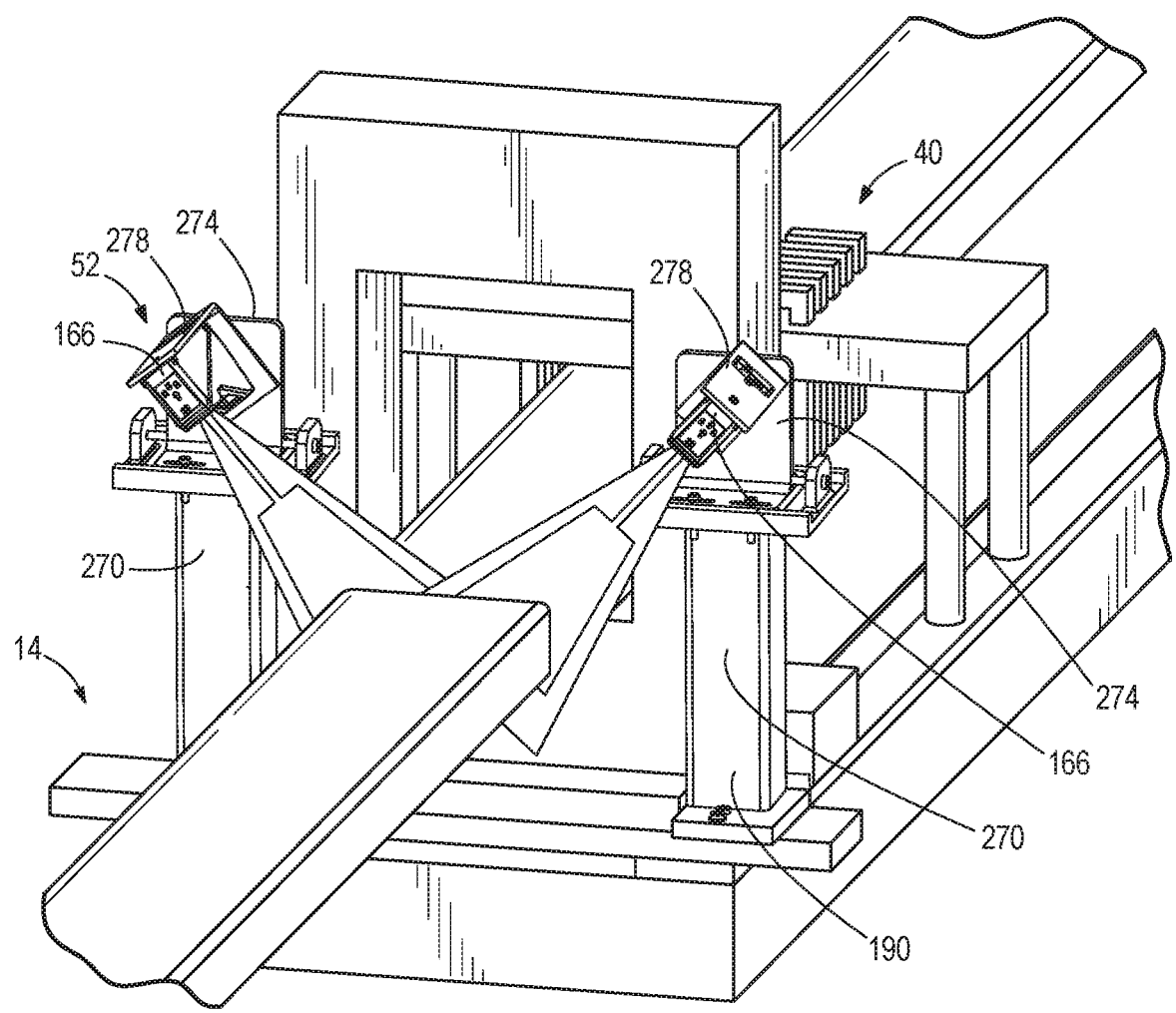
FIG. 12 is a perspective view of the profile sensing station of FIG. 1.

With reference to FIGS. 1 and 12, the sensor(s) 166 is positioned along the axis 30 at a first position 190 located in an upstream direction from the quenching station 48. In the illustrated embodiment, the sensor(s) 166 defines the first profile sensing station 52 positioned upstream of the first heating station 40 on the conveyor path 14. The sensor(s) 166 can include one or more position sensors such as a proximity sensor for sensing (i.e., determining) the shape parameter of the profile of a portion (i.e., cross section) of the workpiece 38 relative to the axis 30 before heating at the first heating station 40. As one specific example, as shown in FIG. 12, the first profile sensing station 52 includes two sensors 166, in which each sensor 166 is positioned at the first position 190 on a stand 270 on opposite sides of the conveyor path 14. The sensors 166 can be laser profile sensors. In some constructions, the sensors 166 are In-sight Laser Profilers available from Cognex Corporation of Natick, Mass., USA. The sensors 166 are rotatably coupled to a head portion 274 of each stand 270. Specifically, the sensors 166 are supported at a fixed position on the head portion 274 using mounts 278 with one or more fasteners (e.g., threaded fasteners). The mounts 278 can be adjustable to enable repositioning of the sensors 166. Specifically, the mounts 278 can move in one or more degrees of freedom including linear movement relative to the stand 270 and/or rotational movement relative to the head portion 274. In the illustrated embodiment, the sensors 166 are at the fixed position such that a laser beam of each sensor 166 is directed towards the conveyor path 14. Furthermore, the laser beams may touch or overlap slightly such that the sensors 166 may have a combined field of view of the entire profile of the workpiece 38 positioned on the conveyor path 14. In other constructions, a single sensor may be used, depending upon the workpiece profile, the position of the sensor, and its field of view. In some constructions, the sensor(s) 166 may cover a particular zone or feature of interest on the workpiece 38, rather than the entire profile. In operation, at least one of the laser beams is used to measure one or all of the monitored dimensions of the cross-sectional shape of the workpiece 38. Specifically, the dimensions may be the flatness or straightness of one of the plurality of distinct sections and/or any one of the angles between the plurality of distinct sections of the cross-sectional shape. The measurements are converted into the output representative of the shape parameter that the controller 162 uses to manipulate the actuator 154.

As shown in FIGS. 1, 4-5, and 9, the profile of the portion (i.e., cross section) of the workpiece 38 may include the cross-sectional shape having the plurality of distinct sections. In the illustrated embodiment, the portion of the workpiece 38 has the C-shape cross section including the web 128 and two flanges 132 positioned at opposite ends of the web 128, as described above. The shape parameter may include a flatness 186 of the web 128 and/or an angle B of one of the flanges 132 relative to the web 128, in which the controller 162 may manipulate the actuator 154 to move the at least one sprayer 92 for at least partially correcting the shape parameter. Specifically, the flatness 186 of the web 128 (FIG. 9A) and/or the angle B (FIG. 9B) may be corrected during quenching by the adjustment of at least one quench block 108, 110 to influence a change in quench points between an upper/outer side of the web 128 and a lower/inner side of the web 128. Alternatively, or additionally, such an adjustment can be carried out in the flange(s) 132. In other words, the shape parameter may be at least partially corrected by at least one or both of straightening a bend in one of the plurality of distinct sections, and altering the angle B of one of the plurality of distinct sections relative to another one of the plurality of distinct sections during quenching by the adjustment of one of the sprayer(s) 92. The adjustment of the position of one of the sprayer(s) 92 with the quench adjustment mechanism 96 may occur at least once for one or more additional portions of the workpiece 38 as the workpiece 38 is conveyed through the apparatus 10. The quench adjustment mechanism 96 may aid in controlling a quenching differential between portions of the workpiece 38 and the amount of such a differential. If the workpiece 38 is measured in spec, then the aim of the quenching station 48 is either uniform quenching or a quenching differential designed to avoid shape change in the workpiece 38. Furthermore, the sensor(s) 166, whether by laser profiling or other suitable measurement techniques, may be used for continuous, real time operation of the sensing/adjusting of the quench or at designated longitudinal points or spans of the workpiece 38.

As shown in FIG. 8, the controller 162, which may be implemented with one or more microprocessors or programmable logic controllers (PLC) along with a terminal or interface, may also adjust the position of one of the sprayers 92 based on a target profile 194 stored in a memory of the controller 162. The measured shape parameter from the at least one sensor 166 of the first profile sensing station 52 may be compared to the target profile 194. Furthermore, the adjustment of one of the sprayer(s) 92 may correct or reduce a deviation of the shape parameter with respect to the stored target profile 194 for partially correcting/keeping the workpiece 38 in spec based on the measured shape parameter from the output of the at least one sensor 166.

As shown in FIG. 1, the second profile sensing station 56 is positioned downstream of the quenching station 48 (i.e., between the quenching station 48 and the second heating station 60). The second profile sensing station 56 includes at least one sensor 198 operable to re-measure the shape parameter(s) of the workpiece 38 for correlation with measurements from the first profile sensing station 52. In other words, as the workpiece 38 is conveyed along the conveyor path 14, the portion of the workpiece 38 is measured by the at least one sensor 166 at the first profile sensing station 52 before heating and again by the at least one sensor 198 at the second profile sensing station 56 after quenching as the portion of the workpiece 38 is conveyed along the conveyor path 14. The second profile sensing station 56 is coupled to the controller 162 such that the controller 162 is configured to receive an output of the at least one sensor 198 of the second profile sensing station 56 representative of the shape parameter. Similarly, the at least one sensor 198 of the second profile sensing station 56 may be a position sensor such as a proximity sensor for sensing (i.e., determining) the shape parameter of the profile of the portion of the workpiece 38 relative to the axis 30 after quenching and before heating at the second heating station 60. The individual data points and/or the resulting algorithm can be stored in the memory for future retrieval and use. The entire process can repeat itself for each different type of workpiece processed through the apparatus 10 so as to build a library of data sets and algorithms according to different workpiece signatures.

As shown in FIGS. 8-9, the controller 162 is programmed to create and/or update an algorithm 204 based on the output of the at least one sensor of the second profile sensing station 56, the output of the at least one sensor 166 of the first profile sensing station 52, and the position of the actuator 154 of the quench adjustment mechanism 96 during quenching of the measured portion of the workpiece 38. Furthermore, the controller 162 may be programmed to continuously monitor the respective outputs of the sensors 166, 198 of both the first and second profile sensing stations 52, 56 in real time and to continuously update the algorithm 204 for determining a continuous, real time shape control algorithm for controlling the quench adjustment mechanism 96. Specifically, the algorithm 204 may determine, for any number of different workpieces, the shape parameter correction achieved by corresponding quench adjustments. The algorithm 204 can be adapted to a plurality of different workpiece "signatures", each of which may respond differently to various adjustments in the quenching station 48, or unique algorithms may be stored and run based on what type of workpiece is being processed. A workpiece signature is determined by factors such as the material type, material thickness(es), and cross-sectional geometry (e.g., length, width, angles between sections). For example, any or all of these parameters can be input into the controller 162 via the user interface at the beginning of a heat treatment operation. Although the system may begin operation according to a base algorithm or base configuration of settings, especially if the controller memory contains historical data of other similar or identical workpieces, the controller 162 can be configured to direct itself through a series of manipulations of any or all of the adjustable parameters of the apparatus 10, and in particular the quenching station 48, as an iterative process to actively learn the relationships and interdependencies among the parameters for the final work product. This can be accomplished by identifying the incoming shape of the workpiece 38 at the first profile sensing station 52, setting and logging a particular configuration of the quenching station 48 (e.g., water pressure or flow, relative sprayer positions, etc.), and detecting the effect on workpiece shape with the second profile sensing station 56.

Figure 10:
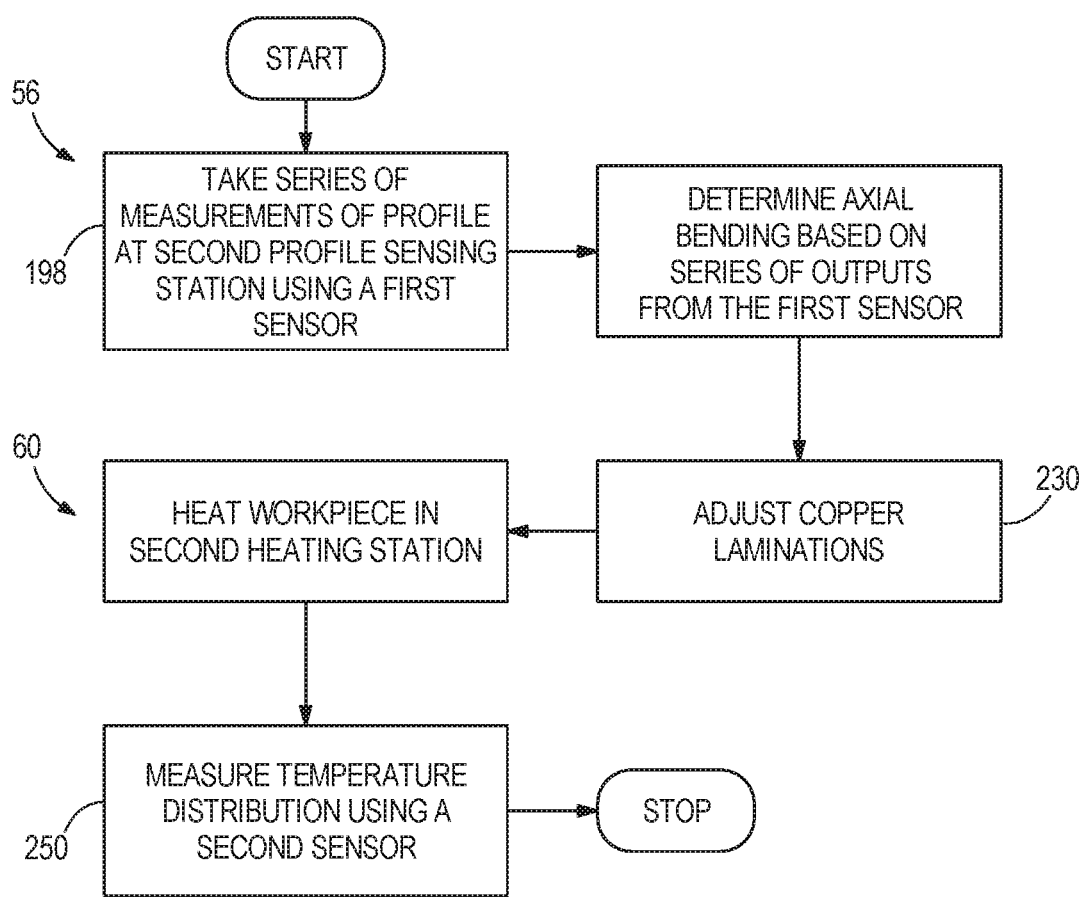
FIG. 10 is yet still another flow diagram illustrating an exemplary method of operating the continuous induction heat treating apparatus of FIG. 1.

With reference to FIGS. 1 and 10, the at least one sensor 198 of the second profile sensing station 56 may be operated to measure the shape parameter of the workpiece 38 at a second position 206 along the axis 30 in a downstream direction from the quenching station 48 as the workpiece 38 moves along the conveyor path 14 (i.e., at a specific location between the quenching station 48 and the second heating station 60). The controller 162 may be further programmed to collect a series of outputs of the at least one sensor 198 representative of the shape parameter at the second profile sensing station 56. The controller 162 is programmed to receive the series of outputs of the at least one sensor 198 and analyze the outputs accordingly to identify axial bowing of the workpiece 38 relative to the axis 30. Specifically, axial bowing refers to lengthwise bowing in the workpiece 38 along the conveyor path 14 relative to the axis 30. The controller 162 can identify the presence or absence of axial bowing, along with the amount and relative position.

Figure 6:
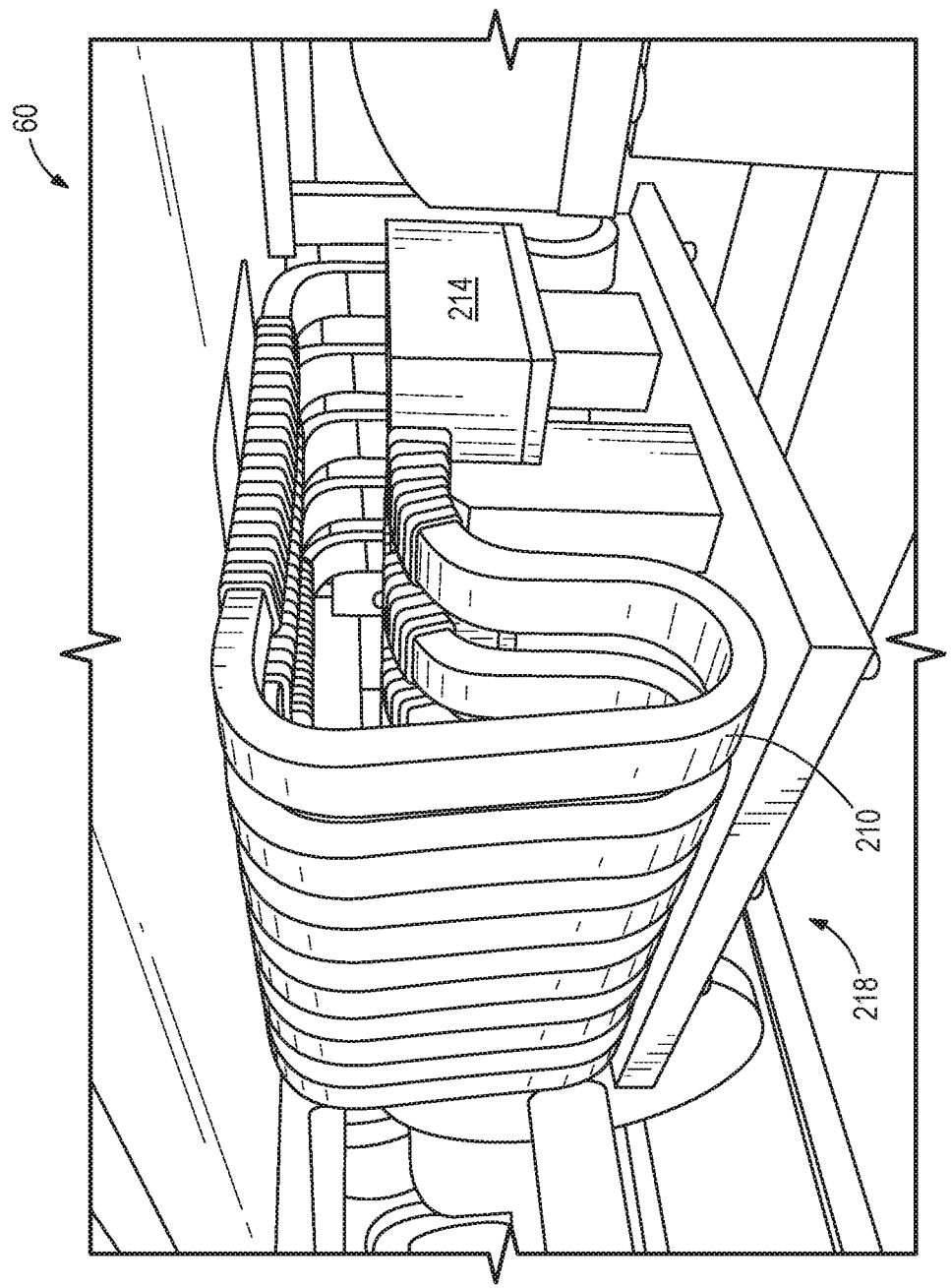
FIG. 6 is a perspective view of the second heating station including copper laminations.
Figure 7:
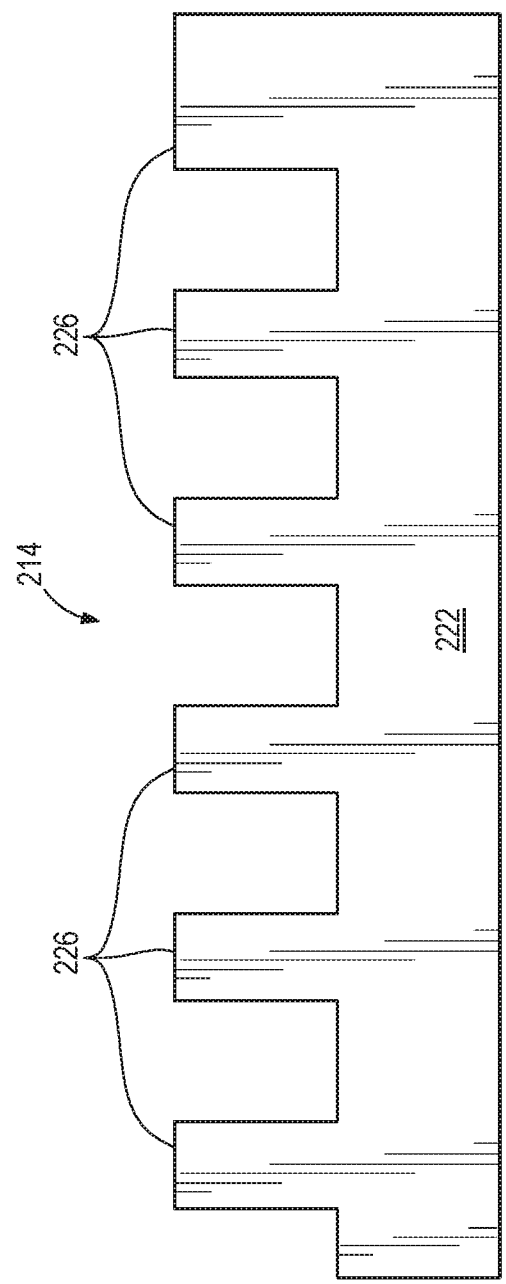
FIG. 7 is a side view of the copper laminations of FIG. 6.

As shown in FIGS. 1 and 6-7, the second heating station 60 is positioned downstream of the second profile sensing station 56. The second heating station 60 includes an induction heating coil 210 and copper laminations 214 for heating (e.g., tempering) the workpiece 38. Similar to the induction heating coil of the first heating station 40, the heating coil 210 is operable to induce heating in the workpiece 38 as the workpiece 38 is conveyed through the second heating station 60. The copper laminations 214 are positioned adjacent or within the induction heating coil 210 and are movable relative to the induction heating coil 210 for changing a heating distribution in the second heating station 60. In the illustrated embodiment, the copper laminations 214 are positioned (i.e., located) near an upper portion 218 relative to the conveyor path 14 of the induction heating coil 210. Furthermore, the illustrated induction heating coil 210 forms a C-shape corresponding to the C-shape cross section of the workpiece 38 (FIG. 6). The induction heating coil 210 of the second heating station 60 may form any shape corresponding to the cross section of the workpiece 38.

As shown in FIG. 7, the copper laminations 214 include a base 222 and a plurality of projections 226 extending toward a top of the induction heating coil 210. The projections 226 may extend between adjacent coils of the induction heating coil 210. The plurality of projections 226 may include at least two projections 226 extending between the upper portion 218 of the induction heating coil 210. For example, the copper laminations 214 include six projections 226 extending from the base 222, as shown in FIG. 7. The copper laminations 214 may be formed by copper sheets stacked together.

As shown in FIGS. 1 and 10, the second heating station 60 further includes an actuator 230 coupled to the copper laminations 214 for adjusting (i.e., moving) the copper laminations 214 relative to the induction heating coil 210. In the illustrated embodiment, the adjusting of the copper laminations 214 includes adjusting a proximity of the copper laminations 214 to the upper portion 218 of the induction heating coil 210. Furthermore, the actuator 230 is coupled to the controller 162 such that the copper laminations 214 are adjusted based on the series of outputs of the at least one sensor 198 representative of the shape parameter of the second profile sensing station 56 in order to reduce or correct the axial bowing of the workpiece 38. Reducing or correcting the axial bowing may also keep the workpiece 38 in spec. In addition, the actuator 230 coupled to the copper laminations 214 and to the controller 162 may form an adjustment mechanism 238 operable to move the copper laminations 214 relative to the induction heating coil 210.

Specifically, adjusting the copper laminations 214 to a location closer to or farther from the induction heating coil 210, respectively, increases or decreases the localized heating effect in the second heating station 60 such that the heating distribution changes. The difference in the heating distribution may reduce or correct the axial bowing of the workpiece 38 relative to the axis 30. For example, the illustrated workpiece 38 has a C-shape cross section including the web 128 and the two flanges 132 positioned at opposite ends of the web 128, as discussed above. Specifically, the web 128 may be introduced to higher temperatures than the two flanges 132 in the second heating station 60. Therefore, the adjusting of the copper laminations 214 may include changing the location of the copper laminations 214 relative to the web 128 of the workpiece 38 to change the heating distribution relative to the web 128. The copper laminations 214 may be adjusted in order to increase or decrease a time-based temperature ramping profile of the web 128 with respect to a time-based temperature ramping profile of the two flanges 132. Even if different time-based temperature ramping profiles are provided by implementation of the copper laminations 214, thus influencing or cancelling axial bowing, it is possible to heat the entire workpiece 38 to a consistent temperature by the downstream end of the second heating station 60 for consistency in obtaining the predetermined material properties in the workpiece 38.

As shown in FIG. 1, the apparatus 10 may further include at least one additional sensor 250 positioned downstream of the second heating station 60 relative to the conveyor path 14. The at least one additional sensor 250 is coupled to the controller 162 and operable for measuring a temperature distribution in the workpiece 38 after heating at the second heating station 60. The at least one additional sensor 250 may include an infrared camera for measuring the temperature distribution. The controller 162 is configured to receive an output of the infrared camera. In addition, the controller 162 may be configured to monitor an evenness of the temperature distribution throughout the workpiece 38 as it is conveyed along the conveyor path 14. The observation of the temperature distribution in the workpiece 38 can provide means to confirm the desired mechanical properties via the heat treatment in the apparatus 10. The workpiece 38 is allowed to cool gradually (i.e., without water quench) following the second heating station 60.

In operation, the workpiece 38 enters the apparatus 10 at the entrance 22. The workpiece 38 is conveyed along the conveyor path 14 using one of the sets of non-restraining guide rollers 34 to the first profile sensing station 52. The shape parameter of one or more additional portions of the workpiece 38 is measured using the at least one sensor 166 of the first profile sensing station 52. At least one of the plurality of sprayers 92 is adjusted using the quench adjustment mechanism 96 based on the output of the at least one senor 166 of the first profile sensing station 52 for each portion of the workpiece 38 measured. Each portion is quenched using the plurality of sprayers 92 as the workpiece 38 is conveyed along the conveyor path 14 through the quenching station 48 for influencing and selectively correcting the shape parameter.

The workpiece 38 is continually moved and supported by another set of non-restraining guide rollers 34 from the quenching station 48 to the second profile sensing station 56. The shape parameter of one or more additional portions of the workpiece 38 is re-measured using the at least one sensor 198 of the second profile sensing station 56. The outputs of the sensors 166, 198 of the first and second profile sensing stations 52, 56 and the position of the actuator 154 are received by the controller 162 for creating/updating the algorithm 204. The algorithm 204 is used for adjusting the plurality of sprayers 92 based on the outputs of the sensors 166, 198 to partially correct the shape parameter. Furthermore, the output of the at least one sensor 198 of the second profile sensing station 56 may be collected in the series of outputs at the second position 206 along the axis 30 in a downstream direction from the quenching station 48 for identifying axial bowing of the workpiece 38 relative to the axis 30.

The controller 162 adjusts the proximity of the copper laminations 214 relative to the induction heating coil 210 based on the series of outputs. The workpiece 38 is continually moved and supported by another set of non-restraining guide rollers 34 from the second profile sensing station 56 through the second heating station 60 having the adjustment in the proximity of the copper laminations 214 for changing the heating distribution in order to reduce or correct the axial bowing of the workpiece 38.

The at least one additional sensor 250 (i.e., the infrared camera) measures the temperature distribution in the workpiece 38. The apparatus 10 monitors the evenness in the temperature distribution throughout the workpiece 38 via the output of the infrared camera before the workpiece 38 leaves the apparatus 10 at the exit 26.

Although in some operations of the apparatus 10, it may be desirable to obtain uniform material properties of the finished workpiece 38 through heat treating process, the apparatus 10 may also be operated to obtain zone hardening of selected portions of the workpiece 38, differentiated either longitudinally (i.e., axially) or as one or more distinct sections of the cross-section. This can be accomplished through advanced algorithms of the controller 162, in combination with one or both of the shape-manipulation strategies occurring at the two heat treating zones of the apparatus 10 as described above.

Various features and advantages of the invention are set forth in the following claims.

What is claimed is:

1. A method of operating a continuous induction heat treating apparatus comprising:
   conveying a workpiece along a conveyor path defining an axis;
   measuring a shape parameter of a profile of a portion of the workpiece with at least one sensor at a position along the axis located in an upstream direction from an induction heating coil;
   conveying the portion of the workpiece through the induction heating coil while the induction heating coil is energized so that the portion of the workpiece is heated;
   conveying the heated portion of the workpiece along the conveyor path from the induction heating coil to a quenching station including a plurality of sprayers;
   adjusting, by a controller in response to an output of the at least one sensor representative of the shape parameter, a position of at least one of the plurality of sprayers with a quench adjustment mechanism including an actuator coupled to the at least one sprayer in order to re-position a point of intersection defined between the at least one sprayer and the axis for at least partially correcting the shape parameter during quenching; and
   quenching the portion of the workpiece by spraying water onto the portion of the workpiece from the plurality of sprayers.

2. The method of claim 1, further comprising repeating the steps of measuring the shape parameter and adjusting the position of the at least one sprayer with the quench adjustment mechanism at least once for one or more additional portions of the workpiece.

3. The method of claim 1, wherein the profile of the portion of the workpiece includes a cross-sectional shape having a plurality of distinct sections, the method further comprising one or both of straightening a bend in one of the plurality of distinct sections, and altering an angle of one of the plurality of distinct sections relative to another one of the plurality of distinct sections during quenching by the adjustment of the at least one sprayer.

4. The method of claim 1, wherein the profile of the portion of the workpiece includes a web and a flange positioned at one end of the web, wherein the shape parameter includes a flatness of the web, and the method further comprising correcting the flatness of the web during quenching by the adjustment of the at least one sprayer.

5. The method of claim 1, wherein the profile of the portion of the workpiece includes a web and a flange positioned at an end of the web, wherein the shape parameter includes an angle of the flange relative to the web, and the method further comprising correcting the angle during quenching by the adjustment of the at least one sprayer.

6. The method of claim 1, wherein the at least one sensor defines a first profile sensing station positioned upstream of the induction heating coil, wherein a second profile sensing station is positioned downstream of the quenching station and includes at least one sensor, the method further comprising re-measuring the shape parameter of the profile at the portion at the second profile sensing station.

7. The method of claim 6, wherein the controller receives a first output of the at least one sensor of the first profile sensing station representative of the shape parameter and a second output of the at least one sensor of the second profile sensing station representative of the shape parameter, the method further comprising determining a continuous real time shape control algorithm for controlling the quench adjustment mechanism based on the second output of the at least one sensor of the second profile sensing station and the first output of the at least one sensor of the first profile sensing station.

8. The method of claim 6, wherein the induction heating coil includes a counter-wound induction coil assembly, wherein the induction heating coil defines a first heating station, and the method further comprising conveying the portion of the workpiece through a second heating station after quenching.

9. The method of claim 8, wherein the second heating station includes an induction heating coil and copper laminations located along an upstream portion of the induction heating coil of the second heating station, the method further comprising adjusting a position of the copper laminations relative to the upstream portion with an actuator, under control of the controller, in response to a series of outputs of the at least one sensor of the second profile sensing station.

10. The method of claim 1, further comprising comparing the measured shape parameter of the profile of the portion to a target profile stored in a memory of the controller, and the adjusting of the at least one sprayer corrects or reduces a deviation of the shape parameter with respect to the stored target profile.

* * * * *